United States Patent
Yu et al.

(10) Patent No.: US 11,153,115 B2
(45) Date of Patent: Oct. 19, 2021

(54) SIGNAL TO NOISE RATIO AND BIT ERROR RATE ESTIMATION FOR WIRED LOCAL AREA NETWORKS AND RELATED SYSTEMS, DEVICES, AND METHODS

(71) Applicant: Microchip Technology Incorporated, Chandler, AZ (US)

(72) Inventors: Jiachi Yu, Guangdong (CN); Dixon Chen, Guangdong (CN); Kevin Yang, Guangdong (CN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/588,764

(22) Filed: Sep. 30, 2019

(65) Prior Publication Data
US 2021/0058268 A1 Feb. 25, 2021

(30) Foreign Application Priority Data
Aug. 23, 2019 (CN) .......................... 201910784063.3

(51) Int. Cl.
*H04L 12/40* (2006.01)
*H04L 12/413* (2006.01)
*H04B 17/309* (2015.01)

(52) U.S. Cl.
CPC ....... *H04L 12/4013* (2013.01); *H04B 17/309* (2015.01); *H04L 12/413* (2013.01)

(58) Field of Classification Search
CPC .. H04L 12/4013; H04L 12/413; H04B 17/309
USPC .................................. 375/225; 370/328, 329
See application file for complete search history.

(56) References Cited

U.S. PATENT DOCUMENTS

| 2008/0069199 | A1 | 3/2008 | Chen et al. |
| 2014/0223208 | A1 | 8/2014 | Eltawil et al. |
| 2016/0112884 | A1* | 4/2016 | Hassan .................. G06F 3/048 370/328 |
| 2016/0119909 | A1* | 4/2016 | Fukuzono ........... H04W 72/046 370/329 |
| 2017/0045564 | A1 | 2/2017 | Kusaka et al. |

OTHER PUBLICATIONS

International Search Report from International Application No. PCT/US2020/0070364, dated Nov. 3, 2020, 4 pages.
International Written Opinion from International Application No. PCT/US2020/0070364, dated Nov. 3, 2020, 8 pages.

* cited by examiner

*Primary Examiner* — Fitwi Y Hailegiorgis
(74) *Attorney, Agent, or Firm* — TraskBritt

(57) ABSTRACT

Systems, device, and methods related to estimating a Signal to Noise Ratio (SNR) of a signal are disclosed. A method of estimating an SNR includes setting a threshold of a comparator of a physical layer device to a first value, applying a signal to the comparator, and determining a first bit error number of an output of the comparator with the threshold set at the first value. The method also includes setting the threshold of the comparator to a second value that is different from the first value, applying the signal to the comparator, and determining a second bit error number of the output of the comparator with the threshold set at the second value. The method further includes determining an SNR of the signal based on the first bit error number and the second bit error number.

24 Claims, 11 Drawing Sheets

SIGNAL TO NOISE RATIO AND BIT ERROR RATE ESTIMATION FOR WIRED LOCAL AREA NETWORKS AND RELATED SYSTEMS, DEVICES, AND METHODS

PRIORITY CLAIM

This application claims the benefit of the filing date of Chinese Provisional Patent Application Serial No. 201910784063.3, filed Aug. 23, 2019, for "SIGNAL TO NOISE RATIO AND BIT ERROR RATE ESTIMATION FOR WIRED LOCAL AREA NETWORKS AND RELATED SYSTEMS, DEVICES, AND METHODS."

TECHNICAL FIELD

The present disclosure relates, generally, to signal to noise ratio (SNR) estimation; and more specifically still, some embodiments relate, generally, to SNR estimation in wired local area networks.

BACKGROUND

The IEEE802.2.3cg™ is defining 10BASE-T1S (also known as "cg") for use with automotive sensors, audio, other devices, and combinations thereof. Other target market segments for cg include backplanes and Internet of Things (IoT) networks.

The cg specification targets a ten megabits per second (Mbps) multi-drop bus that uses Carrier Sense Multiple Access (CSMA) with Physical Layer Collision Avoidance (PLCA).

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
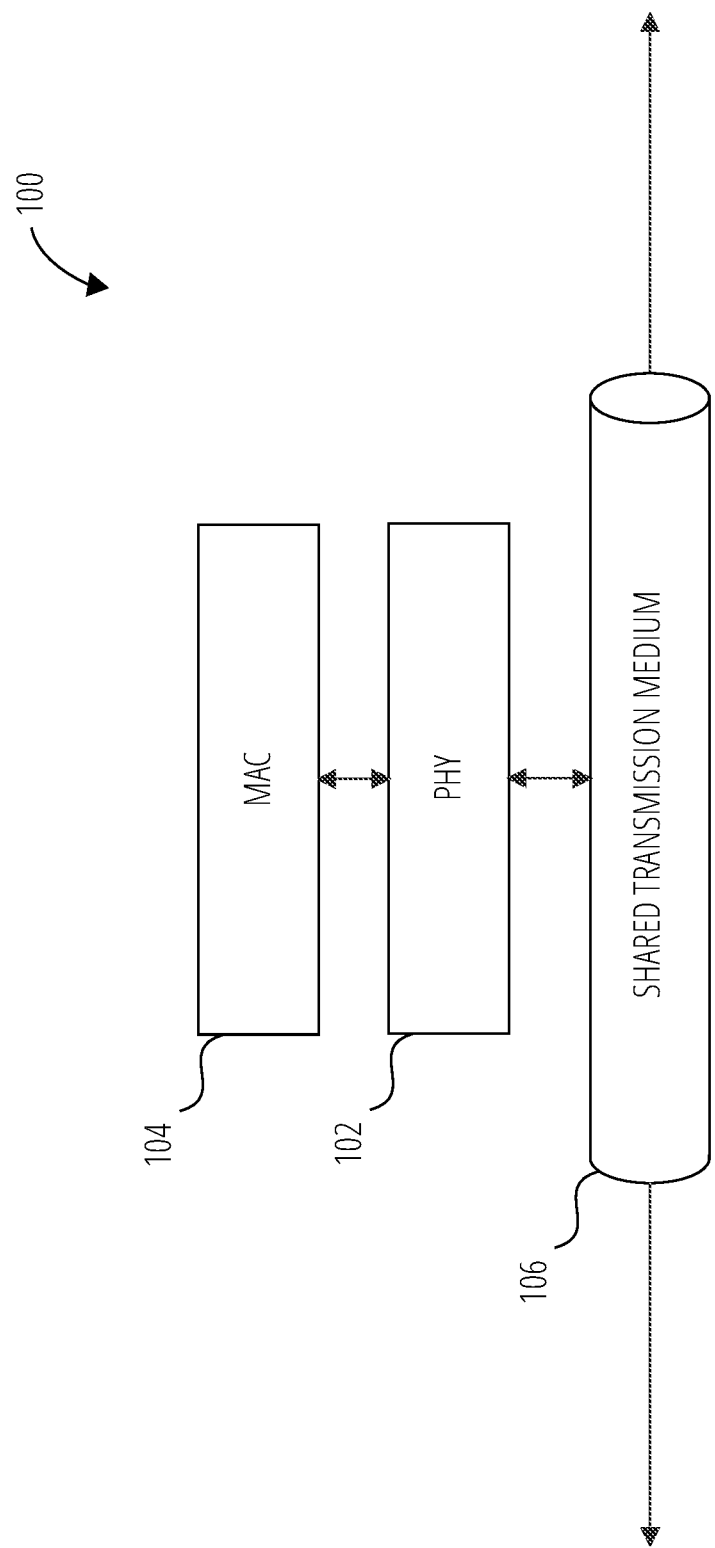
FIG. 1 is a functional block diagram of a network segment including a link layer device, MAC and a physical layer (PHY) device, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A vehicle, such as an automobile, a truck, a bus, a ship, and/or an aircraft, may include a vehicle communication network. The complexity of a vehicle communication network may vary depending on a number of electronic devices within the network. For example, an advanced vehicle communication network may include various control modules for, for example, engine control, transmission control, safety control (e.g., antilock braking), and emissions control. To support these modules, the automotive industry relies on various communication protocols.

10SPE (i.e., 10 Mbps Single Pair Ethernet) is a network technology specification currently under development by the Institute of Electrical and Electronics Engineers as IEEE 802.3 cg™. 10SPE may be used to provide a collision free, deterministic transmission on a multi-drop network. The IEEE802.3cg™ is defining 10BASE-T1S (also known as "cg") for use with automotive sensors, audio, other devices, or combinations thereof. The 10BASE-T1S may also be used in backplanes and Internet of Things (IoT) networks. The cg specification targets a 10 megabits per second (Mbps) multi-drop bus that uses Carrier Sense Multiple Access (CSMA) with Physical Layer Collision Avoidance (PLCA).

In some instances it may be desirable to provide Signal Quality Indicators (SQI) of signals received through a communication bus of a wired Local Area Network (LAN) (e.g., Ethernet). Examples of SQIs may include a Bit Error Rate (BER), a Signal to Noise Ratio (SNR), other indicators, or combinations thereof. Conventionally, SQI for point-to-point links depend on complex Digital Signal Processing (DSP) techniques that involve relatively large chip area to implement and relatively high power expenditures to operate. Where the BER is known, the SNR may be estimated.

The amplitude of Gaussian noise follows a Gaussian distribution. Assuming the data signal amplitude is $\sqrt{E_b}$ and the Gaussian noise amplitude is $\sqrt{N}$, the received signal amplitude $\sqrt{E_b'}$ may be expressed as $\sqrt{E_b'}=\sqrt{E_b}-\sqrt{N}$. When the Gaussian noise $\sqrt{N}$ is added to the signal, the noise $\sqrt{N}$ (calculated by $\sqrt{E_b}=\sqrt{E_b'}$) should follow a Gaussian distribution. If the probability distribution of the received signal amplitude $\sqrt{E_b'}$ is known and the signal amplitude $\sqrt{E_b}$ is known, noise can be calculated according to the Gaussian noise distribution equation and the SNR may be determined thereby.

In practical applications, however, both the signal amplitude $\sqrt{E_b}$ and the noise $\sqrt{N}$ are usually unknown. Although the noise $\sqrt{N}$ can be estimated over time based on detected bit errors, in some instances it may take a very long time to determine the noise $\sqrt{N}$ because bit errors may be relatively rare when the SNR is relatively high (e.g., about one bit error is expected every one and a half months when the SNR is 18 dB).

Embodiments disclosed herein relate to provision of SQI metrics for signals received from a communication bus of a wired LAN (e.g., Ethernet). Embodiments disclosed herein may relate to provision of SQI metrics for use in 10BASE-T1 endpoints and switches. Monitoring of SQI may be useful for performance and functional safety reasons. In some embodiments, disclosed is measurement of SNR of received signals. In some embodiments, disclosed is grading of SNRs of received signals. By way of non-limiting example, a received signal may be graded as having one of several levels of SNR (e.g., eight levels). Also, the SNR may be reported as good, marginal or bad so that corrective action may be taken, if warranted.

Some embodiments disclosed herein relate to the use of two comparator (which may be implemented by a one bit analog to digital converter (ADC) having an adjustable threshold) thresholds (e.g., V1 and V2) that are set to check whether a received signal is less than or greater than the two separate thresholds by comparing the thresholds with recovered data. By counting the compared results for a specific period of time, the probabilities of received signals being less than the two thresholds may be determined. With these two probabilities the SNR and BER can be determined using digital CDR techniques. More specifically, a system of equations based on the two thresholds may be used to determine the SNR. For example, if the probabilities of the received signal amplitude being less than each of the thresholds are known, the signal amplitude $\sqrt{E_b}$ and noise $\sqrt{N}$ can be calculated, and the SNR may be determined. The BER of the received signal may also be computed because the BER is equal to the probability that the noise amplitude $\sqrt{N}$ is larger than the signal amplitude $\sqrt{E_b}$. These SQI parameters (BER and SNR) may thus be determined without the use of conventional DSP systems or Phase Locked Loops (PLLs), utilizing a method that is less complex and uses less chip area and power than conventional solutions.

Some embodiments disclosed herein relate to an SNR calculation algorithm based on BER estimation. The BER is calculated using a signal comparator with its threshold set to values that are different from a level that is halfway between logic levels of a signal. In some embodiments a one bit analog to digital converter with a programmable threshold may be used as the comparator. The threshold may be dynamically adjusted to fit different signals and noise levels. For example, where the signal is set to oscillate between 3.3 and +3.3 Volts corresponding to a logic level low and a logic level high, respectively, a zero volts threshold would be the halfway point between the high and low logic levels. In this case, two non-zero Volt thresholds may be used to increase the probability of bit errors to measurable levels. The BER and SNR of the halfway point threshold may be extrapolated based on the bit error rates measured at the two non-zero Volt thresholds. In some instances, lookup tables relating SNR to bit error counts may be used to determine the SNR. As a result, the SNR may be determined even when limited to a one bit ADC.

Embodiments of the disclosure enable physical layer circuitry to report an SQI and SNR in 10SPE applications. The SQI and SNR may be calculated within an acceptable time, with low power expenditure, and with low implementation complexity. Also, embodiments of the disclosure enable computation of the SNR of signals received from 10SPE communication buses. Furthermore, embodiments of the disclosure enable quick detection and reporting of SQI, even in high SNR environments where it would be difficult to detect the BER by directly counting bit errors over time.

In some embodiments that are compliant with 10SPE, SQI parameters (e.g., SNR, BER) of a signal may be determined as discussed below in either a Carrier Sense Multiple Access with Collision Detection CSMA/CD mode or a PLCA mode. 10SPE regulates multi-drop systems that may work in either CSMA/CD or PLCA modes. When in a PLCA mode, a sender of a received packet may be known. Accordingly, SQI parameter estimation techniques disclosed herein may be applied to each sender individually to determine SQI parameters (e.g., SNR, BER) of the signal carrying the packet. Also, the SQI parameter estimation techniques disclosed herein may be applied to a specific selected sender of a received packet to determine SQI parameters (e.g., SNR, BER) of the signal carrying the packet.

FIG. 1 is a functional block diagram of a network segment 100 including a link layer device, MAC 104, and a physical layer (PHY) device, PHY 102, according to some embodiments. As non-limiting examples, network segment 100 may be a segment of a multi-drop network, a segment of a multi-drop sub-network, a segment of a mixed media network, or a combination thereof or sub combination thereof. As non-limiting examples, network segment 100 may be, be part of, or include one or more of a microcontroller-type embedded system, a user-type computer, a computer server, a notebook computer, a tablet, a handheld device, a mobile device, a wireless earbud device or headphone device, a wired earbud or headphone device, an appliance sub-system, lighting sub-system, sound sub-system, building control systems, residential monitoring system (e.g., for security or utility usage, without limitation) system, elevator system or sub-system, public transit control system (e.g., for above ground train, below ground train, trolley, or bus, without limitation), an automobile system or automobile sub-system, or an industrial control system, without limitation.

PHY 102 may be configured to interface with MAC 104. As non-limiting examples, PHY 102 and/or MAC 104 may be chip packages including memory and/or logic configured for carrying out all or portions of embodiments described herein. As non-limiting examples, PHY 102 and MAC 104, respectively, may be implemented as separate chip packages or circuitry (e.g., integrated circuits) in a single chip package (e.g., a system-in-a-package (SIP)).

PHY 102 also interfaces with shared transmission medium 106, a physical medium that is a communication path for nodes that are part of network segment 100 or a network of which network segment 100 is a part, including nodes that include respective PHY 102 and MAC 104. As a non-limiting example, shared transmission medium 106 may be a single twisted pair such as used for single pair Ethernet.

Signals received through the shared transmission medium 106 may be laden with noise, especially in environments that are especially prone to noise (e.g., automotive environments). In some instances, it may be useful to provide SQI to enable monitoring of the signal quality of received signals. In some embodiments, the PHY 102 may be configured to determine and provide SQI.

Figure 2:
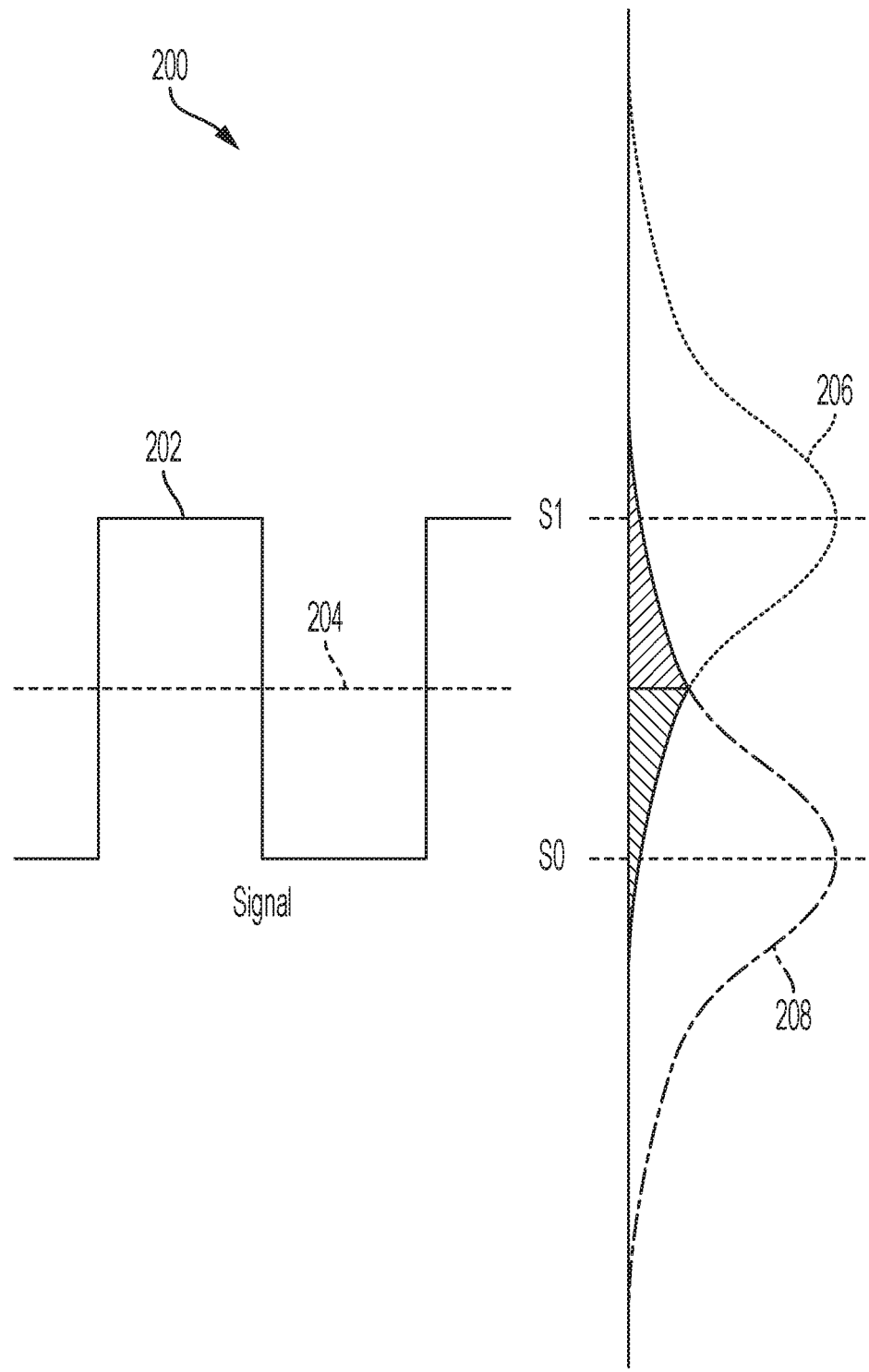
FIG. 2 is a signal noise diagram illustrating the relationship between signal noise and BER, according to some embodiments.

FIG. 2 is a signal noise diagram 200 illustrating the relationship between signal noise and BER, according to some embodiments. The signal noise diagram 200 includes a signal 202 having a logic level high S1 and a logic level low S0. A halfway threshold 204 divides the logic level high S1 from the logic level low S0 so that when the signal 202 is above the halfway threshold 204 the signal 202 is determined to be high and when the signal 202 is below the halfway threshold 204 the signal 202 is determined to be low.

The signal noise diagram 200 also includes a noise probability distribution function or probability density function (PDF) 206 for the logic level high S1 and a noise PDF 208 for the logic level low S0. Stated another way, the noise PDF 206 and the noise PDF 208 indicate the probabilities that the signal 202 will be at certain voltage levels during a logic level high S1 and a logic level low S0, respectively.

In some embodiments, the noise PDF 206 and the noise PDF 208 may be modeled with Gaussian distributions. For Pulse-Amplitude Modulation (PAM), where Y is a received signal (e.g., the signal 202) for which it is desired to determine an SNR, the received signal Y may be given by: Y=S1+N when a logic level high is transmitted (e.g., bit "1"); and Y=S0+N when a logic level low is transmitted (e.g., bit "0"), where S1 is a voltage level of the logic level high, S0 is the voltage level of the logic level low, and N is the noise. The noise of PDF 206 or PDF 208, which may be Gaussian noise following a Gaussian PDF:

$$p(x) = \frac{1}{\sqrt{2\pi\sigma^2}} e^{\frac{-(x-\mu)^2}{2\sigma^2}}$$

where the mean of the Gaussian PDF $\mu=0$, the variance of the Gaussian PDF $\sigma^2=N_0$, x is the value of the received signal Y, and $N_0$ is the noise power.

It then follows that a conditional PDF of the received signal Y may be determined. In the condition in which the received signal Y is at the logic level low S0, the PDF is given by:

$$p(Y|S0) = \frac{1}{\sqrt{2\pi N_0}} e^{\frac{-(Y-\sqrt{E_b})^2}{2N_0}},$$

which corresponds to the noise PDF 208. In the condition in which the received signal Y is at the logic level high S1, the PDF is given by:

$$p(Y|S1) = \frac{1}{\sqrt{2\pi N_0}} e^{\frac{-(Y+\sqrt{E_b})^2}{2N_0}},$$

which corresponds to the noise PDF 206.

Figure 3:
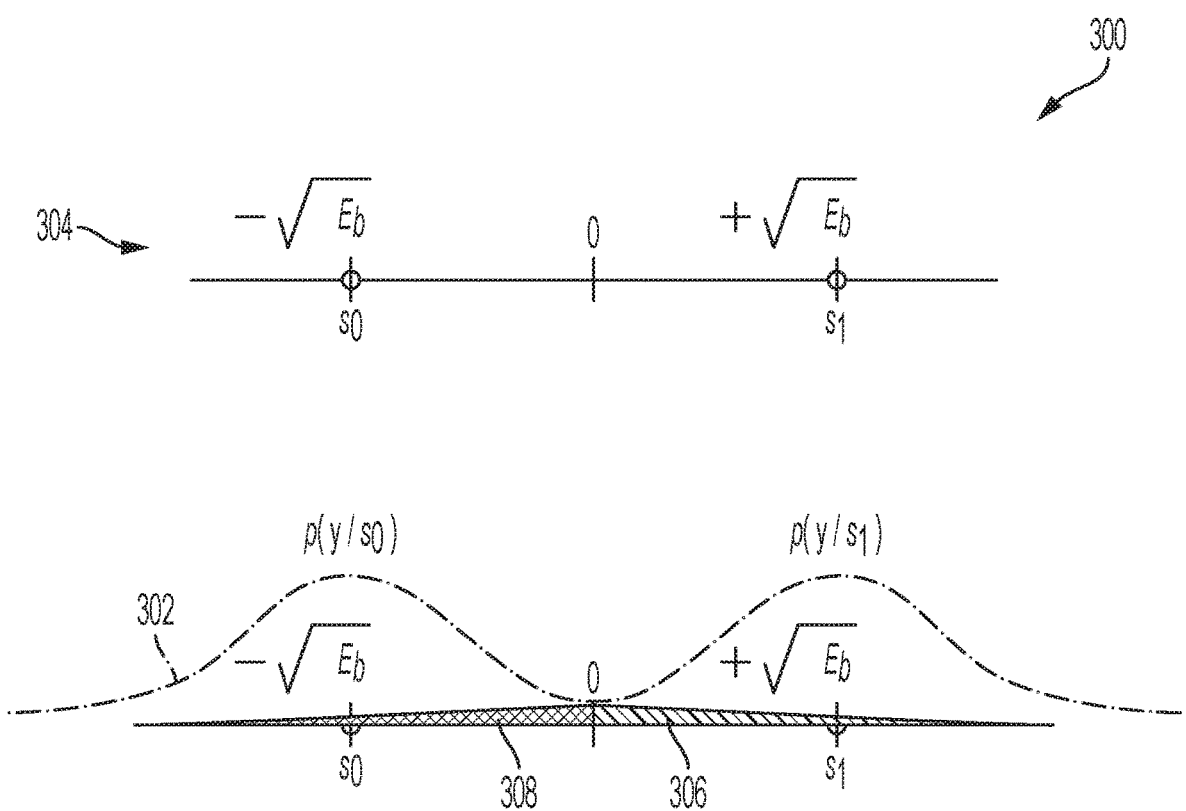
FIG. 3 is a bit error probability diagram, according to some embodiments.

FIG. 3 is a bit error probability diagram 300, according to some embodiments. The bit error probability diagram 300 includes a voltage level diagram 304 showing the logic level low S0 and the logic level high S1, and the halfway threshold (e.g., in the bit error probability diagram 300 of FIG. 3 the halfway threshold is set to 0 Volts). As indicated in FIG. 3, the logic level low S0 corresponds to $-\sqrt{E_b}$ and the logic level high S1 corresponds to $+\sqrt{E_b}$ from the conditional PDF equations discussed above. The quantities $-\sqrt{E_b}$ and $+\sqrt{E_b}$ shift the means of sub PDFs of the conditional PDF to S0 and S1, respectively.

The bit error probability diagram 300 also includes the conditional PDF 302 plotted against the voltage level diagram 304. As illustrated in FIG. 3, the conditional PDF 302 includes the pieces of the conditional PDF equation discussed above including, p(Y|S0) and p(Y|S1). The probability 306 of a bit error for a logic level low S0 and the probability 308 of a bit error for a logic level high S1 are also shown under the conditional PDF 302.

In PAM modulation, for an edge signal (e.g., 1, −1), the error probability is given by:

$$p(e|S_{edge}) = \frac{1}{2}\text{erfc}\left(\frac{1}{\sqrt{2}}\sqrt{\frac{E_b}{N_0}}\right),$$

where:

$$\text{erfc}(s) = \frac{2}{\pi}\int_x^\infty e^{-x^2}dx.$$

In such embodiments, the BER for one side of the signal 202 (e.g., corresponding to either the logic level high S1 or the logic level low S0) is given by:

$$BER_{oneside} = \frac{1}{2}\text{erfc}\left(\frac{1}{\sqrt{2}}\sqrt{SNR}\right).$$

This result shows that the BER, if known, can be used to calculate the SNR (and the SNR, if known, can be used to calculate the BER).

Table 1 below indicates various SNRs for various detected BERs:

TABLE 1

| SNR (dB) | BER (bit errors/second) |
|---|---|
| 12 | 1e−4 |
| 14.5 | 1e−7 |
| 17.3 | 1e−12 |
| 18 | 1e−14 |

Referring to FIGS. 1 and 2 together, a bit error in the signal 202 may be present when the magnitude of the noise is greater than the difference between the signal levels S1 and S0 and the threshold (in this case, the halfway threshold 204, which may be set to zero Volts in some instances). To minimize the BER, the halfway threshold 204 is selected to be halfway between the signal levels S1 and S0. The resulting BER may, however, be too low for practical detection in a short amount of time. For example, in instances where the SNR is about 18 dB, only about one bit error is expected every one and a half months (e.g., the corresponding BER is about 1e−14 as per Table 1 above). Without a practical way to quickly detect the BER, it may be difficult to provide an accurate SNR using the above equation for $BER_{oneside}$. As a result, it may be difficult to report a SQI parameter.

Figure 4:
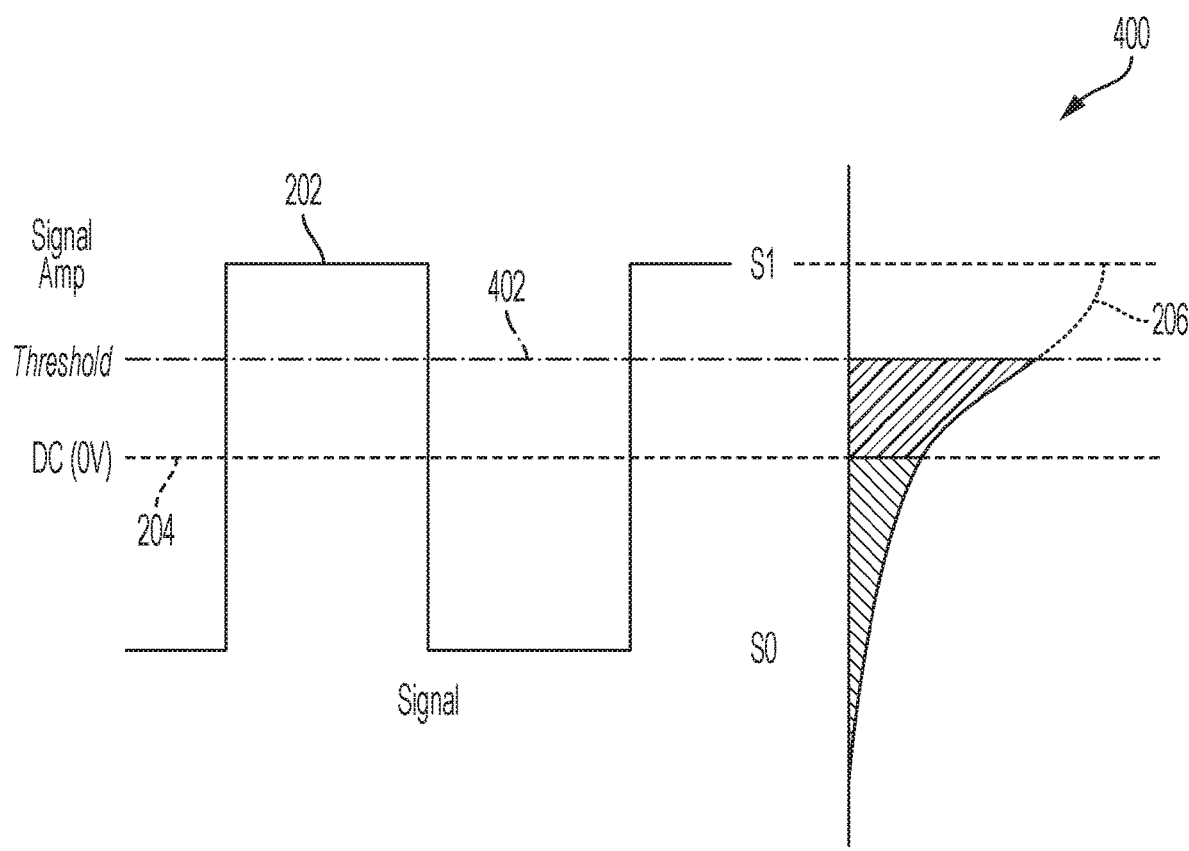
FIG. 4 is a signal noise diagram illustrating the relationship between BER and signal level thresholds, according to some embodiments.

One way to detect the BER of the signal 202 is to replace the halfway threshold 204 with a different threshold that is away from halfway between the signal levels S1 and S0, increasing the BER to detectable levels. FIG. 4 below illustrates how replacing the halfway threshold 204 with a different threshold that is away from halfway between the signal levels S1 and S0 increases the BER.

It should be noted that the noise PDF 206 for the logic level high S1 and the noise PDF 208 for the signal level low S0 are Gaussian distributions. In some embodiments other types of distributions may be used to model the signal noise. For example, a triangle wave distribution, a Laplacian distribution, a uniform distribution, or some other distribution may be used.

FIG. 4 is a signal noise diagram 400 illustrating the relationship between BER and signal level thresholds, according to some embodiments. The signal noise diagram 400 includes the signal 202, the halfway threshold 204, and the noise PDF 206 of the logic level high S1. The signal noise diagram 400 also includes a threshold 402 that is different from the halfway threshold 204 (which is set at zero Volts direct current in the example of FIG. 4). It can be seen in the signal noise diagram 400 that the area defined by the noise PDF 206 and the threshold 402 is greater than the area defined by the noise PDF 206 and the halfway threshold 204 of FIG. 2. As a result, the BER resulting from using the threshold 402 is greater than the BER resulting from using the halfway threshold 204.

The BER at a certain threshold depends on the SNR and on the difference between the signal amplitude of the signal 202 and the threshold between logic levels S1 and S0 (e.g., signal amplitude minus the threshold).

As seen by inspecting the equation above for $BER_{oneside}$, the signal amplitude and the SNR of the signal 202 are unknown factors. As a result, a system of such equations where different observed BERs for different known thresholds may be used to determine the SNR. Since there are two unknowns (SNR, signal amplitude), a system of two equations, each corresponding to a different threshold value, may be used to determine the SNR.

Figure 5:
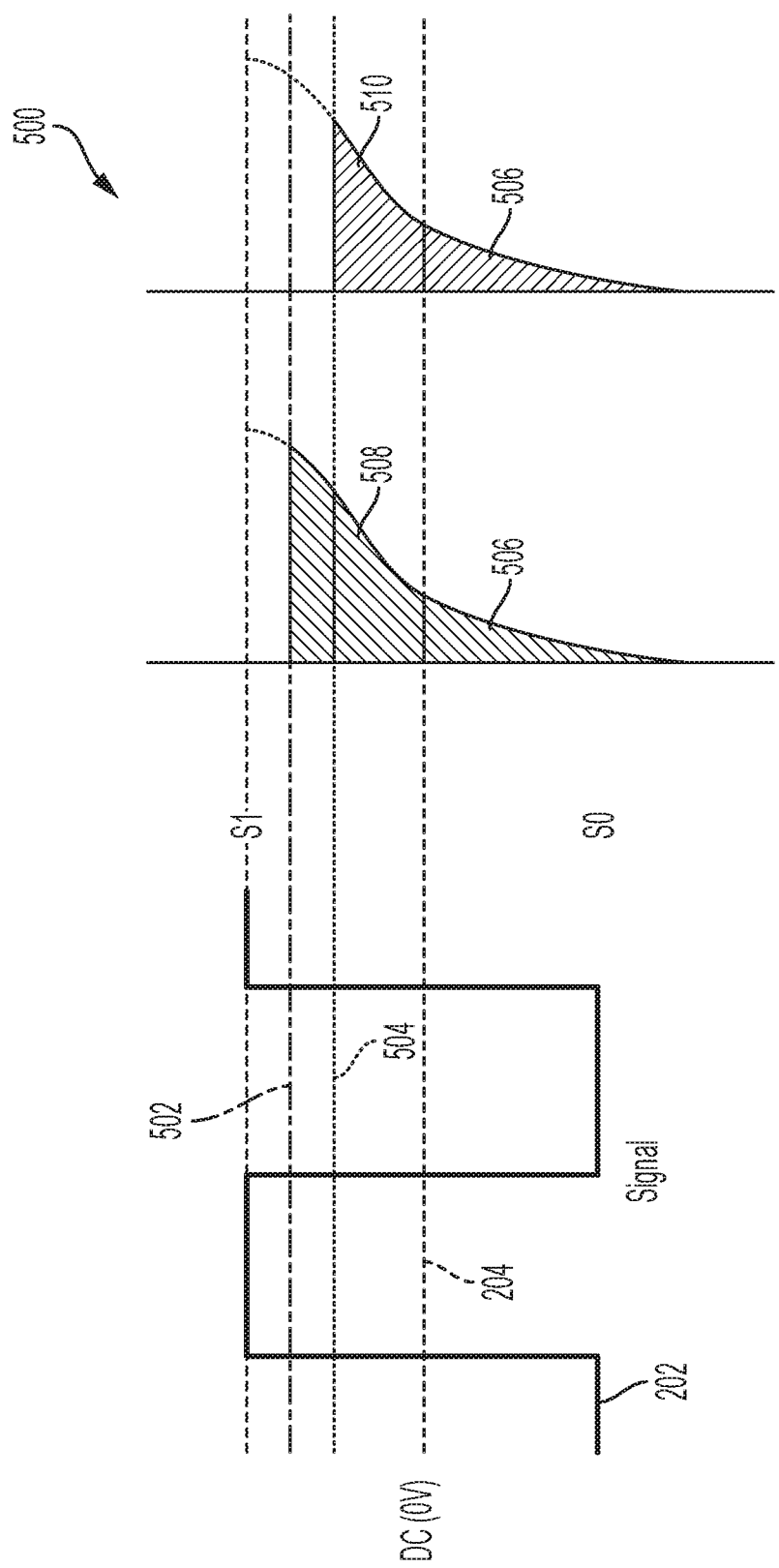
FIG. 5 is a signal noise diagram illustrating different BERs for different thresholds, according to some embodiments.

FIG. 5 is a signal noise diagram 500 illustrating different BERs for different thresholds, according to some embodiments. The signal noise diagram 500 includes the signal 202, the halfway threshold 204, the logic level high S1, and the logic level low S0, as discussed above with reference to FIG. 2. The signal noise diagram 500 also includes two instances of a noise PDF 506, one for a first threshold 502 and one for a second threshold 504, to illustrate the probabilities of the signal 202 taking different voltage levels while at the logic level high S1 with noise (e.g., Gaussian noise) added thereto.

The signal noise diagram 500 illustrates that a first area 508 defined by the noise PDF 506 and the first threshold 502 is greater than a second area 510 defined by the noise PDF 506 and the second threshold 504. As a result, it would be expected that a larger BER (e.g., BER1) would result from the first threshold 502 than a BER (e.g., BER2) of the second threshold 504. Assuming that the first area 508 and the second area 510 are large enough to correspond to a high enough probability for detectable bit errors in a relatively short period of time, the BERs (e.g., BER1 and BER2) may be detectable in the relatively short period of time. Since the thresholds (e.g., the first threshold 502 and the second threshold 504) are known values and the BERs are measurable, a system of two equations (a first equation corresponding to the first threshold 502 and a second equation corresponding to the second threshold 504) may be created to determine the SNR of the signal 202.

The BERs (e.g., BER1 and BER2) may be determined by counting bit error numbers (e.g., a first bit error number corresponding to the first threshold 502 and a second bit error number corresponding to the second threshold 504) of the output of the comparator with the comparator set alternately at the first threshold 502 and the second threshold 504 over a period of time. The BERs may be computed by dividing the bit error numbers by the period of time. The mathematics for computing the SNR from the BER1, BER2, the first threshold 502, and the second threshold 504 will now be discussed with reference to FIG. 6.

Figure 6:
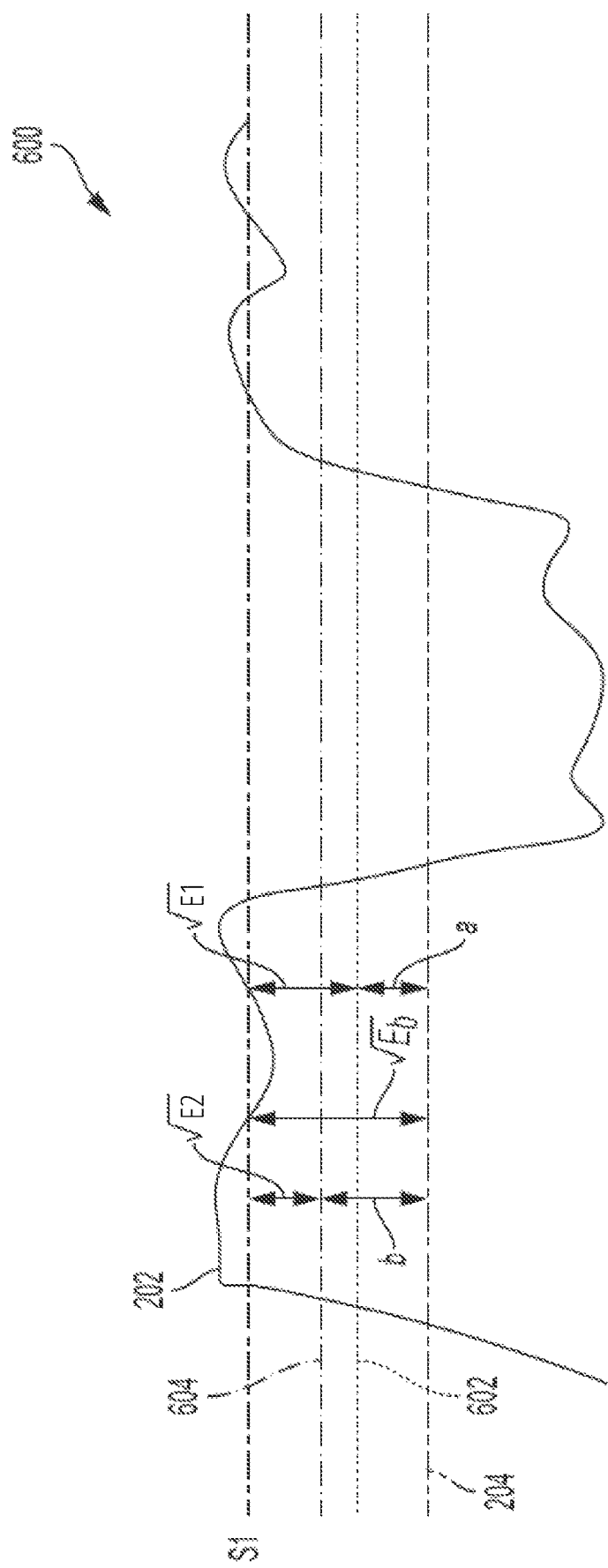
FIG. 6 is a noisy signal diagram to show details of computation of an SNR, according to some embodiments.

FIG. 6 is a noisy signal diagram 600 to show details of computation of an SNR, according to some embodiments. The noisy signal diagram 600 includes the signal 202, the halfway threshold 204, and the logic level high S1 discussed above. The noisy signal diagram 600 also indicates a first threshold 602 set at a difference a from the halfway threshold 204 and a second threshold 604 set at a difference b from the halfway threshold 204. The noisy signal diagram 600 further defines the following parameters:

$\sqrt{E_b}$, which is the difference between the logic level high signal level S1 and the halfway threshold 204;

$\sqrt{E_1}$, which is the difference between the logic level high signal level S1 and the first threshold 602; and $\sqrt{E_2}$, which is the difference between the logic level high signal level S1 and the second threshold 604.

Based on these parameters, an SNR corresponding to the first threshold 602 may be given as:

$$SNR_1 = \frac{E_1}{N}$$

It then follows that:

$$\frac{\sqrt{E_1}}{\sqrt{N}} = \frac{\sqrt{E_b} - a}{\sqrt{N}}$$

An SNR corresponding to the second threshold 604 may be given as:

$$SNR_2 = \frac{E_2}{N}$$

It then follows that:

$$\frac{\sqrt{E_2}}{\sqrt{N}} = \frac{\sqrt{E_b} - b}{\sqrt{N}}$$

Combining the SNR equations for the first threshold 602 and the second threshold 604 (SNR1 and SNR2) results in:

$$b\frac{\sqrt{E_1}}{\sqrt{N}} - a\frac{\sqrt{E_2}}{\sqrt{N}} =$$
$$b\frac{\sqrt{E_b} - a}{\sqrt{N}} - a\frac{\sqrt{E_b} - b}{\sqrt{N}} = (b-a)\frac{\sqrt{E_b}}{\sqrt{N}} = (b-a)\sqrt{SNR}.$$

As a result, the SNR of the signal 202 may be given by:

$$SNR = \left(\frac{\frac{b}{a}\sqrt{SNR_1} - \sqrt{SNR_2}}{\frac{b}{a} - 1}\right)^2.$$

$SNR_1$ and $SNR_2$ may be calculated from BER1 and BER2 using:

$$BER = \frac{1}{2}\mathrm{erfc}\left(\frac{1}{\sqrt{2}}\sqrt{SNR}\right),$$

where erfc(x) is the complimentary error function of a quantity x, given by:

erfc(x)=1−erf(x), where erf(x) is the error function of the quantity x, given by:

$$\mathrm{erf}(x) = \frac{2}{\pi}\int_0^x e^{-t^2}dt.$$

As a result, if the input signal sample point level is larger than a receive data threshold (e.g., the halfway threshold 204) used by receive circuitry, the first threshold 602 BER (BER1) and the second threshold 604 BER (BER2) can be used to calculate the SNR of the signal 202. Accordingly, BER1 and BER2 may be obtained by comparing data taken from a signal at a first threshold 602 with data taken at the halfway threshold 204. If the data is the same, there are no bit errors. If the data is the same, there is a bit error. Thus, BER1 may be obtained by comparing data obtained based on first threshold 602 to data obtained based on the halfway threshold 204, and BER2 may be obtained by comparing data obtained based on the second threshold 604 with data obtained based on the halfway threshold 204.

Figure 7:
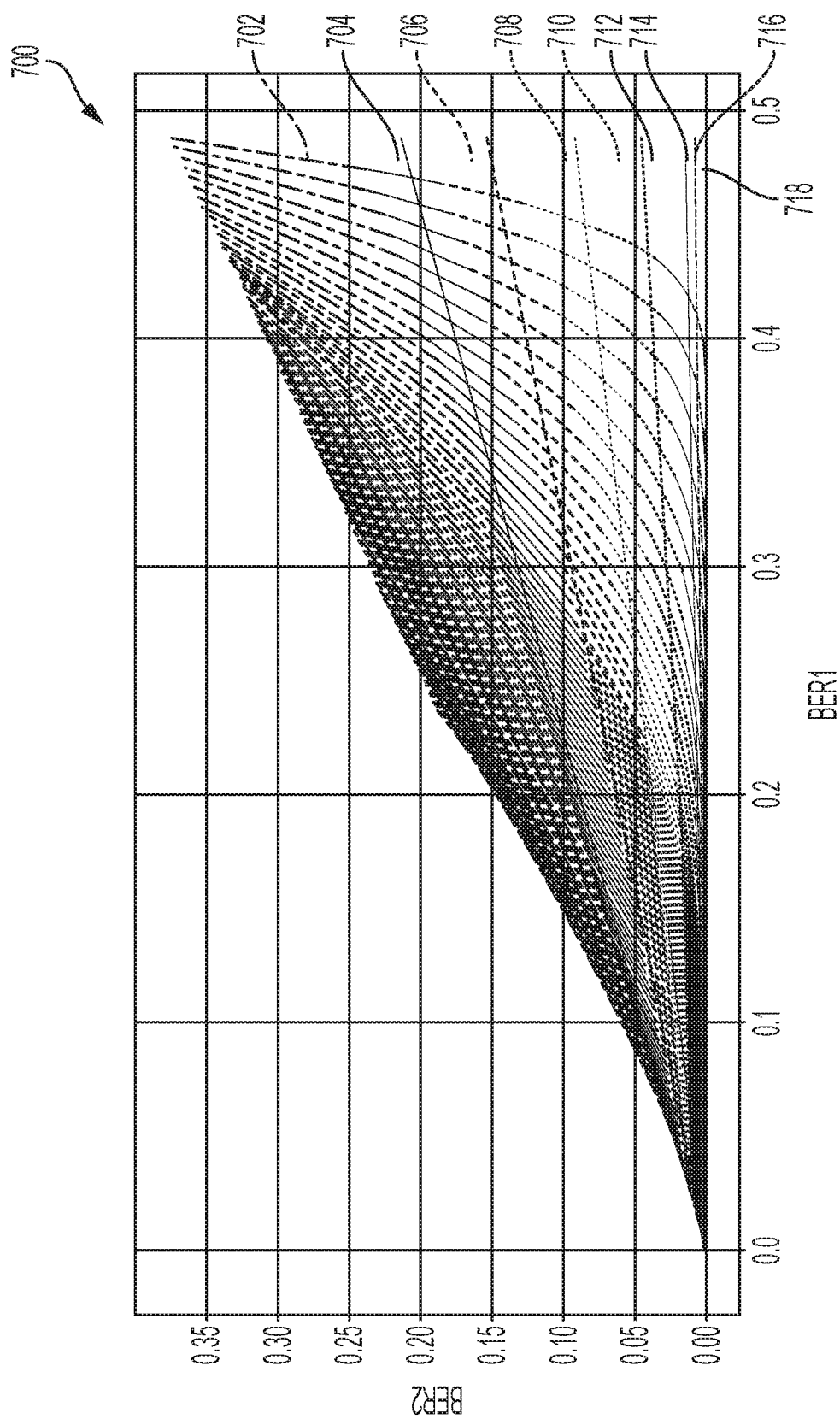
FIG. 7 is a plot correlating different SNR values to various values of measured BERs corresponding to different thresholds, according to some embodiments.

As can be seen by inspecting the above-discussed mathematics, the computations involved in determining the SNR may be relatively complex. As a result, rather than performing these computations in real-time, embodiments herein may rely on previously-calculated values for the SNR to reduce the amount of computation that is performed during operation. For example, data corresponding to different SNRs correlated to various values of BER1 and BER2 may be stored. As a result, once BER1 and BER2 are determined, a corresponding SNR may be looked up in the stored data rather than calculating the SNR directly (e.g., similar to a lookup table). FIG. 7 below illustrates one such example.

FIG. 7 is a plot 700 correlating different SNR values to various values of measured BERs corresponding to different thresholds, according to some embodiments. The horizontal axis of plot 700 is directed to BER1, corresponding to a first threshold, and the vertical axis of plot 700 is directed to BER2, corresponding to a second threshold. The plot 700 is separated into a plurality of different SNR zones including an SNR<12 dB zone 702, an SNR>12 dB zone 704, an SNR>14 dB zone 706, an SNR>16 dB zone 708, an SNR>18 dB zone 710, an SNR>20 dB zone 712, an SNR>20 dB zone 714, an SNR>22 dB zone 716, and an SNR>24 dB zone 718.

To approximate an SNR of a received signal, the threshold of a comparator may be set to a first value and a first BER (BER1) may be measured. The threshold of the comparator may be set to a second value and a second BER (BER2) may be measured. An approximation of the SNR of the received signal may be estimated by identifying which SNR zone of the plot 700 includes an intersection between BER1 and BER2. For example, if BER1 is 0.2 and BER2 is 0.1, the SNR falls in the SNR>14 dB zone 706. It may therefore be determined that the SNR of the signal is between 14 dB and 16 dB.

Figure 8:
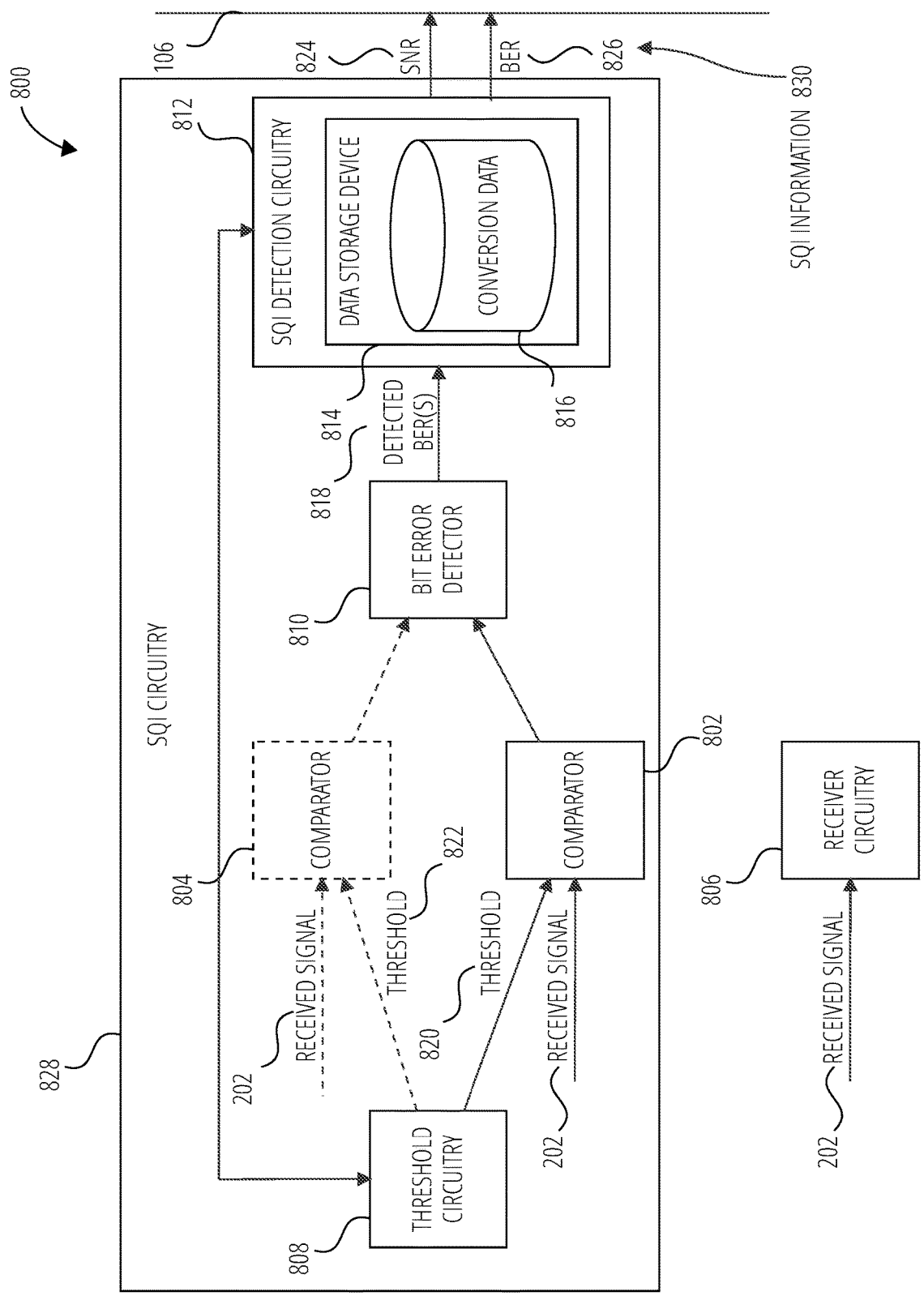
FIG. 8 is a block diagram of a portion of PHY of the network segment of FIG. 1.

FIG. 8 is a block diagram of a portion 800 of PHY 102 of the network segment 100 of FIG. 1. The portion 800 includes SQI circuitry 828 and receiver circuitry 806. The SQI circuitry 828 is configured to estimate SQI information 830 (e.g., SNR 824, BER 826) of a received signal 202 received from a shared transmission medium (e.g., the shared transmission medium 106 of FIG. 1) of a wired local area network (e.g., Ethernet). The receiver circuitry 806 is configured to process the signal 202. In some embodiments the receiver circuitry 806 includes a comparator to (e.g., a one bit Analog to Digital Converter (ADC)) having its threshold set to a halfway threshold (e.g., the halfway threshold 204 of FIG. 2) to minimize bit errors in processing the signal 202.

In order to enable the PHY 102 to determine an SNR of the signal 202 and report SQI metrics according to embodiments disclosed herein, the SQI circuitry 828 includes a comparator 802 and threshold circuitry 808 configured to control a threshold 820 of the comparator 802. In some embodiments the comparator 802 includes a one bit ADC. Comparator 802 is arranged to receive the signal 202. The threshold circuitry 808 is configured to control the threshold 820 to be different from the halfway threshold to increase a BER of an output of the comparator 802 to quickly-detectable levels (e.g., by increasing the probability of bit errors).

The SQI circuitry 828 further includes a bit error detector 810 configured to detect bit errors in an output of the comparator 802, and provide a detected BER 818 to SQI detection circuitry 812. The SQI detection circuitry 812 is configured to use the detected BER 818 corresponding to at least two different values of the threshold 820 to determine the SNR 824 of the signal 202.

In some embodiments the SQI detection circuitry 812 is configured to control the threshold circuitry 808 to adjust the threshold 820. In some embodiments the SQI detection circuitry 812 itself is configured to set values of the threshold 820, and provide those values to the threshold circuitry 808. In such embodiments the SQI detection circuitry 812 has the threshold values for use in determining the SNR 824 (e.g., a ratio between b and a, which are differences between the thresholds 604, 602, respectively, and the halfway threshold 204, as shown in FIG. 6 may be used to determine the SNR 824). In some embodiments the threshold circuitry 808 itself is configured to set the values of the threshold 820. In such embodiments the threshold circuitry 808 may report the values of the threshold 820 to the SQI detection circuitry 812. Also, the SQI detection circuitry 812 may report the detected BERs 818 back to the threshold circuitry 808 to enable the threshold circuitry 808 to adjust the values of the threshold 820 as needed (e.g., according to method 1000 of FIG. 10). For example, if the threshold 820 is set to a value that is insufficient to prompt the BER of the output of the comparator 802 to be high enough to be detected in a practical period of time, the threshold circuitry 808 may increase or be controlled to increase the difference between the value of the threshold 820 and the halfway threshold to increase the probability of bit errors (e.g., using the method 1000 of FIG. 10).

In some embodiments the SQI circuitry 828 may include a single comparator 802 for use in detecting the SNR of the signal 202. In such embodiments, the threshold circuitry 808 may be configured to adjust the threshold 820 to a first value and a second value at different points in time and the SQI detection circuitry 812 may determine the SNR 824 based on two values of the detected BER 818 at those different points in time.

In some embodiments, the SQI circuitry 828 may include an additional comparator 804 arranged to receive signal 202, and the threshold circuitry 808 may be configured to adjust the threshold 820 for the comparator 802 to a first value and adjust a threshold 822 for the additional comparator 804 to a second value. In such embodiments the bit error detector 810 may be configured to at least partially contemporaneously (e.g., simultaneously) detect the bit errors at the outputs of both the comparator 802 and the additional comparator 804, and provide the detected BER 818 of each of the comparator 802 and the comparator 804 to the SQI detection circuitry 812. In such embodiments, the SNR 824 may be determined more quickly than in embodiments where only a single comparator 802 is used to detect BER1 and BER2 during separate periods of time.

In some embodiments, the SQI detection circuitry 812 may include a data storage device 814 having conversion data 816 stored thereon. The conversion data 816 may include information corresponding to different SNR values correlated to various values of BER1 and BER2 (corresponding to the first value and the second value of the comparator threshold). As a result, once BER1 and BER2 are determined, a corresponding SNR may be looked up in the stored data rather than calculating the SNR directly (e.g., similar to a lookup table). In other words, the SQI circuitry 828 is configured to determine the SNR of the signal 202 by selecting one of the plurality of SNR values that corresponds to a BER pair that is proximate to (e.g., matches) BER1 and BER2. By way of non-limiting example, the conversion data 816 may include data corresponding to the plot 700 of FIG. 7. In this example eight different levels of SNR may be used, and an SQI parameter (e.g., SQI information 830) reported by the PHY 102 (FIG. 1) may be one of the eight SNR levels illustrated in FIG. 7.

In some embodiments, the SQI detection circuitry 812 may also be configured to determine a BER 826 of the signal 202, which may be reported by the PHY 102 as SQI information 830. In some embodiments, the SQI detection circuitry 812 may be configured to determine the BER 826 based on the SNR 824. By way of non-limiting example, the SQI detection circuitry 812 may be configured to compute the BER 826 based on the SNR 824 using the equations discussed above with reference to FIG. 3. Also by way of non-limiting example, the SQI detection circuitry 812 may be configured to store, in the conversion data 816 information relating a plurality of BER values to a plurality of SNR values, such as those of Table 1 above. In this example the SQI detection circuitry 812 may estimate the BER 826 to be the one of the stored values of BER that corresponds to the SNR 824 as stored in the conversion data 816. In other words, the SQI circuitry 828 may be configured to determine the BER of the signal by identifying one of the SNR values that is proximate to the determined SNR 824 of the signal 202 from the plurality of SNR values and select a corresponding BER from the plurality of BER values as the BER 826 of the signal. The portion 800 of the PHY 102 may, in some embodiments, be configured to report the SQI information 830 to the shared transmission medium 106.

In some embodiments the portion 800 includes one or more processors configured to perform the operations of the portion 800. In some embodiments, some or all of the portion 800 may be implemented using software or firmware stored by one or more data storage devices and executed by processing circuitry (see the computing device 1100 of FIG. 11). In some embodiments, some or all of the portion 800 may be implemented using electrical hardware components such as combinational logic. By way of non-limiting example, some or all of the portion 800 may be implemented using a Field Programmable Gate Array (FPGA), a Programmable Logic Controller (PLC), other logic device, or combinations thereof.

Figure 9:
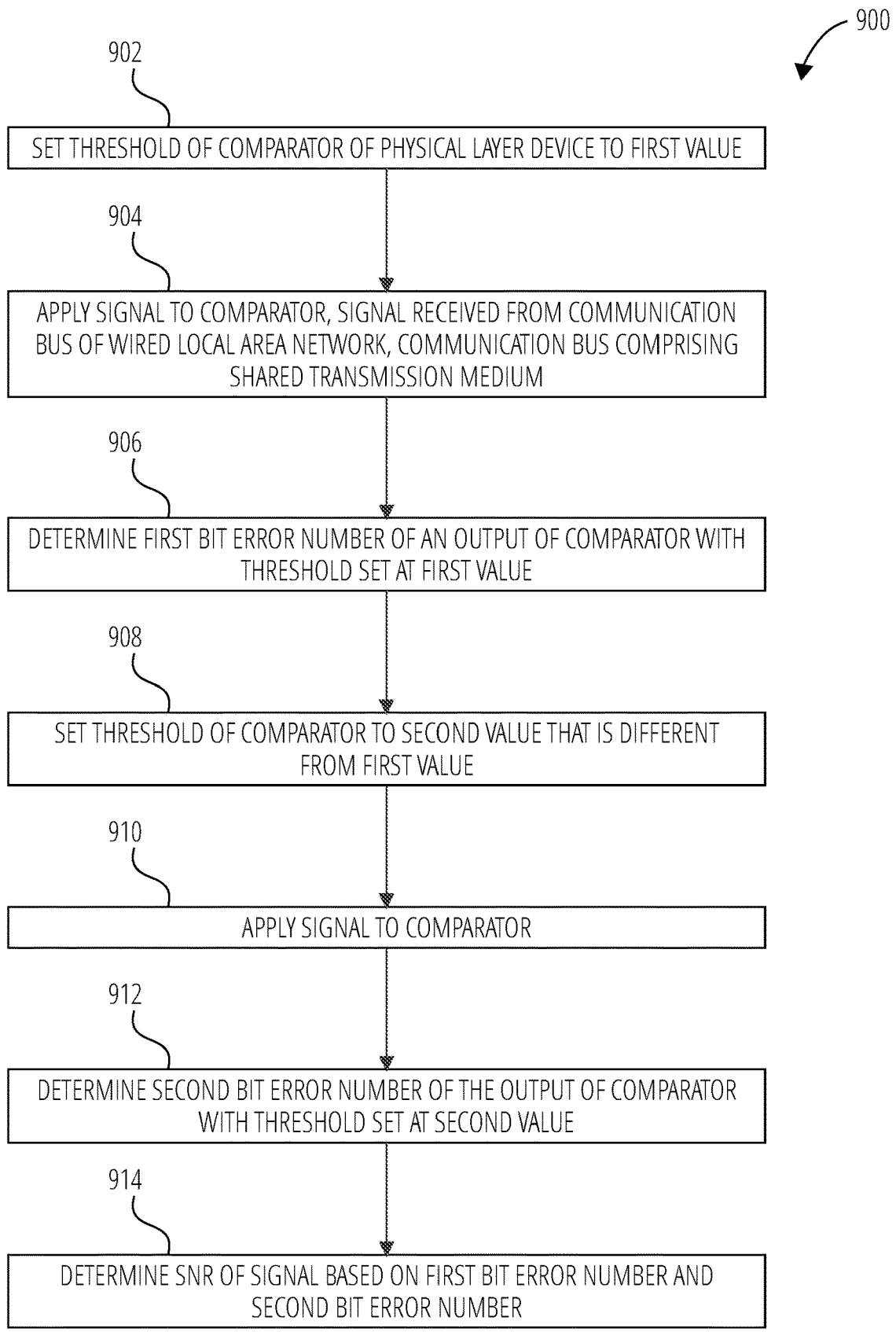
FIG. 9 is a flowchart illustrating a method of estimating an SNR of a signal, according to some embodiments.

FIG. 9 is a flowchart illustrating a method 900 of estimating an SNR of a signal, according to some embodiments. In operation 902, method 900 sets a threshold of a comparator of a physical layer device (e.g., the PHY 102 of FIG. 1) to a first value. As discussed above, the first value of the threshold is different from a halfway threshold (e.g., the halfway threshold 204 of FIG. 2) to increase the BER of an output of the comparator to a quickly detectable level. In operation 904, method 900 applies a signal received from a communication bus (e.g., shared transmission medium 106 of FIG. 1) of a wired local area network (e.g., an Ethernet network) to the comparator. In operation 906, method 900 determines a first bit error number of an output of the comparator with the threshold set at the first value of operation 904. In some embodiments, determining a first bit error number of an output of the comparator with the threshold set at the first value includes the method 1000 of FIG. 10 below.

In operation 908, method 900 sets the threshold of the comparator to a second value that is different from the first value. In operation 910, method 900 applies the signal to the comparator. In operation 912, method 900 determines a second bit error number of the output of the comparator with the threshold set at the second value. In some embodiments, determining a second bit error number of the output of the comparator with the threshold set at the second value includes performing, for the second value of the threshold and the second bit error number, the method 1000 of FIG. 10.

In some embodiments, the comparator includes a first comparator and a second comparator. In some embodiments, the comparator includes a single comparator. In some embodiments, determining the first bit error number of the output of the comparator with the threshold set at the first value comprises determining the first bit error number of a first output of the first comparator with a first threshold of the first comparator set at the first value. In some embodiments, determining the second bit error number of the output of the comparator with the threshold set at the second value comprises determining the second bit error number of a second output of the second comparator with a second threshold of the second comparator set at the second value. In some embodiments, determining the first bit error number of the first output of the first comparator is performed at least partially contemporaneously with determining the second bit error number of the second output of the second comparator with the second threshold set at the second value. In some embodiments, determining the first bit error number of the output of the comparator with the threshold set at the first value and determining the second bit error number of the output of the comparator with the threshold set at the second value are performed at least partially contemporaneously. In some embodiments, determining the first bit error number of the output of the comparator with the threshold set at the first value and determining the second bit error number of the output of the comparator with the threshold set at the second value are performed over separate periods of time.

In operation 914, method 900 determines an SNR of the signal based on the first bit error number and the second bit error number. In some embodiments, determining the SNR of the signal based on the first bit error number includes determining a bit error rate of the signal based on the determined SNR. In some embodiments, determining the bit error rate of the signal based on the determined SNR includes storing conversion data including a plurality of BERs corresponding to a plurality of SNRs and determining the BER of the signal by referencing the stored conversion data. In some embodiments, determining the SNR includes storing, in a data storage device, conversion data including a plurality of SNRs corresponding to combinations of first bit error numbers and second bit error numbers and referencing the stored conversion data to match the first bit error number and the second bit error number to an SNR from the plurality of SNRs stored in the conversion data.

Figure 10:
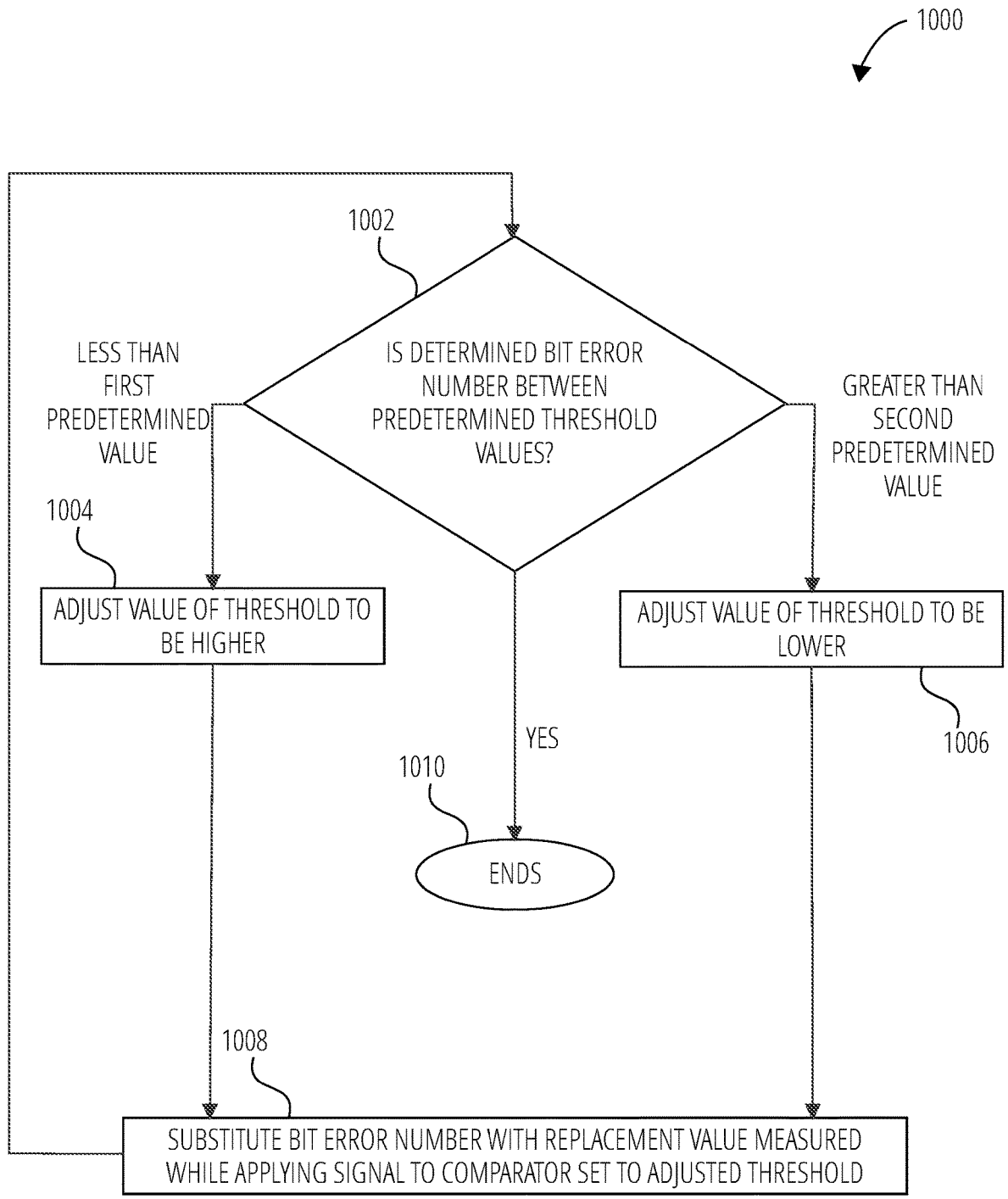
FIG. 10 is a flowchart illustrating a method of setting a threshold of a comparator to a value, according to some embodiments.

FIG. 10 is a flowchart illustrating a method 1000 of setting a threshold of the comparator to a value (e.g., operation 902 and/or operation 908 of FIG. 9), according to some embodiments. This threshold adjustment may be applied to both a first threshold for obtaining BER1 and to a second threshold for obtaining BER2 to ensure that these thresholds result in BERs within reasonable ranges. For example, maximum (i.e., a second predetermined value of FIG. 10) and minimum (i.e., a first predetermined value of FIG. 10) limitations are set for the BERs to ensure stable bit error counts. The BER will not be stable and may not be acceptable if the threshold results in a counted bit error number being too small (e.g., zero to two bit errors during a detection time period). Also, if the threshold results in a counted bit error number being too large, (e.g., the threshold level is greater than or equal to the signal), there may be too many bit errors to accurately determine the bit error rate. Accordingly, in some embodiments, a first predetermined value corresponding to a minimum limitation for bit error counts may be set to two bit errors during a detection period of time. A second predetermined value corresponding to a maximum limitation for bit error counts may be set to a bit error count corresponding to the threshold being set at a magnitude of the signal. It should be noted that other design choices for the first predetermined value and the second predetermined value may be made depending on specifics of different implementations of disclosed embodiments.

In decision 1002, method 1000 determines whether a determined bit error number is between predetermined threshold values (e.g., a first predetermined value and a second predetermined value). In operation 1004, method 1000 adjusts a value of the threshold to be higher if the determined bit error number is less than a first pre-determined threshold value. In operation 1006, method 1000 adjusts the value of the threshold to be lower if the determined bit error number is greater than a second pre-determined threshold value. The first and second predetermined threshold values may be set to levels corresponding to practical detection levels of bit errors. For example, if it is desired to detect the BER of the output of the comparator within one millisecond (1 ms), appropriate threshold values corresponding to multiple expected bit errors within one millisecond may be selected. If the BER is too low, it may take too long between bit errors to determine the bit error number in a practical period of time. If the BER is too high, the output of the comparator may have too many bit errors to accurately determine a BERs.

In operation 1008, method 1000 substitutes the bit error number with a replacement value measured while applying the adjusted threshold value of operation 1004 or operation 1006 digital signal to the comparator. The method 1000 returns to decision 1002, and repeats until the determined first bit error number is not less than or greater than predetermined threshold values, in which case the method 1000 ends 1010.

Figure 11:
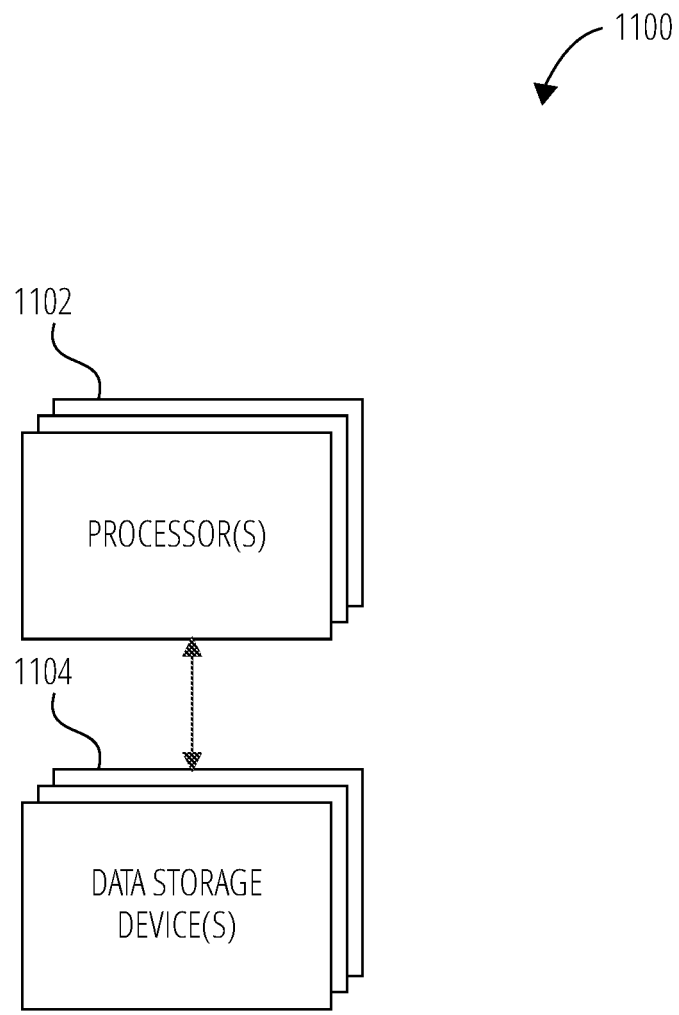
FIG. 11 is a block diagram of a computing device that may be used in some embodiments.

FIG. 11 is a block diagram of a computing device 1100 that may be used in some embodiments. The computing device 1100 includes one or more processors 1102 (sometimes referred to herein as "processors" 1102) operably coupled to one or more data storage devices 1104 (sometimes referred to herein as "storage" 1104). The storage 1104 includes computer-readable instructions stored thereon. The computer-readable instructions are configured to instruct the processors 1102 to perform operations of embodiments disclosed herein. For example, the computer-readable instructions may be configured to instruct the processors 1102 to perform at least a portion or a totality of the method 900 of FIG. 9 and/or the method 1000 of FIG. 10. As another example, the computer-readable instructions may be configured to instruct the processors 1102 to perform at least a portion or a totality of the operations discussed for the portion 800 (FIG. 8) of PHY 102 (FIG. 1). As a specific, non-limiting example, the computer-readable instructions may be configured to instruct the processors 1102 to perform at least a portion or a totality of the operations discussed for the SQI detection circuitry 812, the threshold circuitry 808, the bit error detector 810, the comparator 802, the comparator 804, the receiver circuitry 806, other devices discussed herein, or combinations thereof (see FIG. 8).

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

EXAMPLES

A non-exhaustive, non-limiting list of example embodiments follows. Not each of the example embodiments listed below are individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1

A physical layer device, comprising a comparator configured to compare a signal to a threshold, the signal received from a shared transmission medium of a wired local area network; and Signal Quality Indicator (SQI) circuitry configured to: adjust the threshold to obtain bit error rates of an output of the comparator corresponding to a plurality of different thresholds; and determine a Signal to Noise Ratio (SNR) of the signal based on the bit error rates.

Example 2

The physical layer device of Example 1, wherein the SQI circuitry is configured to: adjust the threshold to a first value and obtain a first bit error rate of the output of the comparator during a first period of time; adjust the threshold to a second value and obtain a second bit error rate of the output of the comparator during a second period of time; and determine the SNR of the signal based on the first bit error rate and the second bit error rate.

Example 3

The physical layer device of Example 1, further comprising an additional comparator configured to compare the signal to an additional threshold, wherein the SQI circuitry is configured to: adjust the threshold to a first value and obtain the first bit error rate of the output of the comparator during a period of time; adjust the additional threshold to a second value and obtain the second bit error rate of an output of the additional comparator during the period of time; and determine the SNR of the signal based on the first bit error rate and the second bit error rate.

Example 4

The physical layer device according to any one of Examples 1-3, further comprising receive circuitry configured to process the signal received from the communication bus.

Example 5

The physical layer device of Example 4, wherein the receive circuitry includes a receive comparator configured to compare the signal to a halfway threshold level, the halfway threshold level halfway between a logic level high and a logic level low of the signal.

Example 6

The physical layer device according to any one of Examples 1-5, wherein the SQI circuitry is further configured to determine a Bit Error Rate (BER) of the signal based on the SNR of the signal.

Example 7

The physical layer device of Example 6, further comprising a data storage device including conversion data stored thereon, the conversion data including a plurality of SNR values and a plurality of BER values corresponding to the plurality of SNR values, wherein the SQI circuitry is configured to determine the BER of the signal by identifying one of the SNR values that is proximate to the determined SNR of the signal from the plurality of SNR values and select a corresponding BER from the plurality of BER values as the BER of the signal.

Example 8

The physical layer device according to any one of Examples 1-7, further comprising a data storage device including conversion data stored thereon, the conversion data including a plurality of SNR values and a plurality of pairs of Bit Error Rate (BER) values corresponding to the plurality of SNR values, wherein the SQI circuitry is configured to determine the SNR of the signal by selecting one of the plurality of SNR values that corresponds to a BER pair that is proximate to the first bit error rate and the second bit error rate.

Example 9

The physical layer device according to any one of Examples 1-8, wherein the physical layer device is configured to report SQI information including the SNR of the signal to the wired local area network via the shared transmission medium.

Example 10

A method of estimating a signal to noise ratio (SNR) of a signal, the method comprising: setting a threshold of a comparator of a physical layer device to a first value; applying a signal to the comparator, the signal received from a communication bus of a wired local area network, the communication bus comprising a shared transmission medium; determining a first bit error number of an output of the comparator with the threshold set at the first value; setting the threshold of the comparator to a second value that is different from the first value; applying the signal to the comparator; determining a second bit error number of the output of the comparator with the threshold set at the second value; and determining an SNR of the signal based on the first bit error number and the second bit error number.

Example 11

The method of Example 10, further comprising determining a bit error rate of the signal based on the determined SNR.

Example 12

The method of Example 11, further comprising storing conversion data comprising a plurality of bit error rates corresponding to a plurality of SNRs, wherein determining a bit error rate of the signal comprises referencing the stored conversion data.

Example 13

The method according to any one of Examples 10-12, further comprising storing, in a data storage device, conversion data comprising a plurality of SNRs corresponding to combinations of first bit error numbers and second bit error numbers, wherein determining an SNR comprises referencing the stored conversion data to correlate the first bit error number and the second bit error number to an SNR from the plurality of SNRs stored in the conversion data.

Example 14

The method according to any one of Examples 10-13, wherein determining the first bit error number of the output of the comparator with the threshold set at the first value comprises: adjusting the first value of the threshold to be higher if the determined first bit error number is less than a first pre-determined threshold value; adjusting the first value of the threshold to be lower if the determined first bit error number is greater than a second pre-determined threshold value; and substituting the first bit error number with a replacement value measured while applying the signal to the comparator set to the adjusted threshold.

Example 15

The method of according to any one of Examples 10-14, wherein: the comparator includes a first comparator and a second comparator; determining the first bit error number of the output of the comparator with the threshold set at the first value comprises determining the first bit error number of a first output of the first comparator with a first threshold of the first comparator set at the first value; and determining the second bit error number of the output of the comparator with the threshold set at the second value comprises determining the second bit error number of a second output of the second comparator with a second threshold of the second comparator set at the second value.

Example 16

The method of Example 15, wherein determining the first bit error number of the first output of the first comparator is performed at least partially contemporaneously with determining the second bit error number of the second output of the second comparator with the second threshold set at the second value.

Example 17

The method according to any one of Examples 10-16, wherein determining the first bit error number of the output of the comparator with the threshold set at the first value and determining the second bit error number of the output of the comparator with the threshold set at the second value are performed at least partially contemporaneously.

Example 18

The method according to any one of Examples 10-15, wherein determining the first bit error number of the output of the comparator with the threshold set at the first value and determining the second bit error number of the output of the comparator with the threshold set at the second value are performed over separate periods of time.

Example 19

A physical layer device, comprising: one or more processors; and one or more data storage devices having computer-readable instructions stored thereon, the computer-readable instructions configured to instruct the one or more processors to: set a threshold of a comparator of a physical layer device to a first value while a signal is applied thereto, the signal received from a communication bus of a wired local area network, the first value different from a halfway threshold value that is halfway between logic voltage levels of the signal, the communication bus comprising a shared transmission medium; determine a first bit error number of an output of the comparator with the threshold set at the first value; set the threshold of the comparator to a second value while the signal is applied thereto, the second value different from the first value and the halfway threshold value; determine a second bit error number of the output of the comparator with the threshold set at the second value; and determine a signal to noise ratio (SNR) of the signal based on the first bit error number and the second bit error number.

Example 20

The physical layer device of Example 19, further comprising a semiconductor chip package housing the one or more processors and the one or more data storage devices.

Example 21

The physical layer device according to any one of Examples 19 and 20, wherein the computer-readable instructions are further configured to instruct the one or more processors to determine a Bit Error Rate (BER) of the signal based on the SNR of the signal.

Example 22

The physical layer device according to any one of Examples 1-9, wherein the SQI circuitry is configured to determine the SNR of the signal in one of a Carrier Sense Multiple Access with Collision Detection (CSMA/CD) mode or a Physical Layer Collision Avoidance mode.

Example 23

The physical layer device according to any one of Examples 1-9 and 22, wherein the SQI circuitry is configured to determine SNRs of signals received from a plurality of different senders.

Example 24

The physical layer device according to any one of Examples 1-9 and 22-23, wherein the SQI circuitry is configured to determine the SNR of the signal if it is determined that the signal was received from a predetermined specific sender.

CONCLUSION

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A physical layer device, comprising:
 a comparator configured to compare a signal to a threshold, the signal received from a shared transmission medium of a wired local area network; and
 Signal Quality Indicator (SQI) circuitry configured to:
  adjust the threshold to obtain bit error rates of an output of the comparator corresponding to a plurality of different thresholds during a plurality of different periods of time, the plurality of different thresholds corresponding to the plurality of different periods of time; and
  determine a Signal to Noise Ratio (SNR) of the signal based on the bit error rates for the plurality of different thresholds.

2. The physical layer device of claim 1, wherein the SQI circuitry is configured to:
 adjust the threshold to a first value and obtain a first bit error rate of the output of the comparator during a first period of time;
 adjust the threshold to a second value and obtain a second bit error rate of the output of the comparator during a second period of time; and
 determine the SNR of the signal based on the first bit error rate and the second bit error rate.

3. The physical layer device of claim 1, further comprising receive circuitry configured to process the signal received from the shared transmission medium.

4. The physical layer device of claim 3, wherein the receive circuitry includes a receive comparator configured to compare the signal to a halfway threshold level, the halfway threshold level being halfway between a logic level high and a logic level low of the signal.

5. The physical layer device of claim 1, wherein the SQI circuitry is further configured to determine a Bit Error Rate (BER) of the signal based on the SNR of the signal.

6. The physical layer device of claim 5, further comprising a data storage device including conversion data stored thereon, the conversion data including a plurality of SNR values and a plurality of BER values corresponding to the plurality of SNR values, wherein the SQI circuitry is configured to determine the BER of the signal by identifying one of the SNR values that is proximate to the determined SNR of the signal from the plurality of SNR values and select a corresponding BER from the plurality of BER values as the BER of the signal.

7. The physical layer device of claim 1, further comprising a data storage device including conversion data stored thereon, the conversion data including a plurality of SNR values and a plurality of pairs of Bit Error Rate (BER) values corresponding to the plurality of SNR values, wherein the SQI circuitry is configured to determine the SNR of the signal by selecting one of the plurality of SNR values that corresponds to a BER pair that is proximate to a first bit error rate and a second bit error rate.

8. The physical layer device of claim 1, wherein the physical layer device is configured to report SQI information including the SNR of the signal to the wired local area network via the shared transmission medium.

9. The physical layer device of claim 1, wherein the SQI circuitry is configured to determine the SNR of the signal in one of a Carrier Sense Multiple Access with Collision Detection (CSMA/CD) mode or a Physical Layer Collision Avoidance mode.

10. The physical layer device of claim 1, wherein the SQI circuitry is configured to determine SNRs of signals received from a plurality of different senders.

11. The physical layer device of claim 1, wherein the SQI circuitry is configured to determine the SNR of the signal if it is determined that the signal was received from a predetermined specific sender.

12. A physical layer device, comprising:
 a comparator configured to compare a signal to a threshold, the signal received from a shared transmission medium of a wired local area network;
 an additional comparator configured to compare the signal to an additional thresholds; and
 SQI circuitry is configured configured to:
  adjust the threshold to obtain bit error rates of an output of the comparator corresponding to a plurality of different thresholds;
  adjust the threshold to a first value and obtain a first bit error rate of the output of the comparator during a period of time;
  adjust the additional threshold to a second value and obtain a second bit error rate of an output of the additional comparator during the period of time; and
  determine a signal to noise ratio (SNR) of the signal based on the first bit error rate and the second bit error rate.

13. A method of estimating a signal to noise ratio (SNR) of a signal, the method comprising:
 setting a threshold of a comparator of a physical layer device to a first value;
 applying a signal to the comparator, the signal received from a communication bus of a wired local area network, the communication bus comprising a shared transmission medium;
 determining a first bit error number of an output of the comparator with the threshold set at the first value;
 setting the threshold of the comparator to a second value that is different from the first value;
 applying the signal to the comparator;
 determining a second bit error number of the output of the comparator with the threshold set at the second value; and
 determining an SNR of the signal based on the first bit error number and the second bit error number.

14. The method of claim 13, further comprising determining a bit error rate of the signal based on the determined SNR.

15. The method of claim 14, further comprising storing conversion data comprising a plurality of bit error rates corresponding to a plurality of SNRs, wherein determining a bit error rate of the signal comprises referencing the stored conversion data.

16. The method of claim 13, further comprising storing, in a data storage device, conversion data comprising a plurality of SNRs corresponding to combinations of first bit error numbers and second bit error numbers, wherein determining the SNR comprises referencing the stored conversion data to correlate the first bit error number and the second bit error number to an SNR from the plurality of SNRs stored in the conversion data.

17. The method of claim 13, wherein determining the first bit error number of the output of the comparator with the threshold set at the first value comprises:
- adjusting the first value of the threshold to be higher if the determined first bit error number is less than a first pre-determined threshold value;
- adjusting the first value of the threshold to be lower if the determined first bit error number is greater than a second pre-determined threshold value; and
- substituting the first bit error number with a replacement value measured while applying the signal to the comparator with the threshold set to the adjusted first value.

18. The method of claim 13, wherein:
- the comparator includes a first comparator and a second comparator;
- determining the first bit error number of the output of the comparator with the threshold set at the first value comprises determining the first bit error number of a first output of the first comparator with a first threshold of the first comparator set at the first value; and
- determining the second bit error number of the output of the comparator with the threshold set at the second value comprises determining the second bit error number of a second output of the second comparator with a second threshold of the second comparator set at the second value.

19. The method of claim 18, wherein determining the first bit error number of the first output of the first comparator is performed at least partially contemporaneously with determining the second bit error number of the second output of the second comparator with the second threshold set at the second value.

20. The method of claim 13, wherein determining the first bit error number of the output of the comparator with the threshold set at the first value and determining the second bit error number of the output of the comparator with the threshold set at the second value are performed at least partially contemporaneously.

21. The method of claim 13, wherein determining the first bit error number of the output of the comparator with the threshold set at the first value and determining the second bit error number of the output of the comparator with the threshold set at the second value are performed over separate periods of time.

22. A physical layer device, comprising:
- one or more processors; and
- one or more data storage devices having computer-readable instructions stored thereon, the computer-readable instructions configured to instruct the one or more processors to:
    - set a threshold of a comparator of a physical layer device to a first value while a signal is applied thereto, the signal received from a communication bus of a wired local area network, the first value different from a halfway threshold value that is halfway between logic voltage levels of the signal, the communication bus comprising a shared transmission medium;
    - determine a first bit error number of an output of the comparator with the threshold set at the first value;
    - set the threshold of the comparator to a second value while the signal is applied thereto, the second value different from the first value and the halfway threshold value;
    - determine a second bit error number of the output of the comparator with the threshold set at the second value; and
    - determine a signal to noise ratio (SNR) of the signal based on the first bit error number and the second bit error number.

23. The physical layer device of claim 22, further comprising a semiconductor chip package housing the one or more processors and the one or more data storage devices.

24. The physical layer device of claim 22, wherein the computer-readable instructions are further configured to instruct the one or more processors to determine a Bit Error Rate (BER) of the signal based on the SNR of the signal.

* * * * *

UNITED STATES PATENT AND TRADEMARK OFFICE
CERTIFICATE OF CORRECTION

PATENT NO. : 11,153,115 B2
APPLICATION NO. : 16/588764
DATED : October 19, 2021
INVENTOR(S) : Jiachi Yu, Dixon Chen and Kevin Yang It is certified that error appears in the above-identified patent and that said Letters Patent is hereby corrected as shown below:

In the Claims

Claim 12,    Column 22,    Lines 20, 21,    change "to an additional thresholds; and
    SQI circuitry is configured configured to:" to
    --to an additional threshold; and
    SQI circuitry configured to:--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*